United States Patent
Frink

[11] Patent Number: 5,933,079
[45] Date of Patent: Aug. 3, 1999

[54] SIGNAL DISCRIMINATOR AND POSITIONING SYSTEM

[75] Inventor: Bentley D. Frink, Shallotte, N.C.

[73] Assignee: Remote Data Systems, Inc., Whiteville, N.C.

[21] Appl. No.: 08/705,311

[22] Filed: Aug. 29, 1996

Related U.S. Application Data

[60] Provisional application No. 60/003,102, Sep. 1, 1995.

[51] Int. Cl.$^6$ ........................................................ G08B 1/08
[52] U.S. Cl. ................. 340/539; 340/573.1; 340/825.36; 340/825.49; 455/524; 342/463; 342/457; 342/458; 342/46; 342/47; 701/25
[58] Field of Search ..................................... 340/539, 573, 340/825.36, 825.49, 990, 995; 455/56.1, 524, 227.1; 342/463, 457, 21, 45, 465, 458, 46, 47; 701/25; 180/168

[56] References Cited

U.S. PATENT DOCUMENTS

| | | | |
|---|---|---|---|
| 4,641,317 | 2/1987 | Fullerton | 375/200 |
| 4,813,057 | 3/1989 | Fullerton | 375/259 |
| 4,979,186 | 12/1990 | Fullerton | 375/239 |
| 5,134,408 | 7/1992 | Harmuth | 342/21 |
| 5,204,814 | 4/1993 | Noonan et al. | 701/25 |
| 5,216,429 | 6/1993 | Nakagawa et al. | 342/45 |
| 5,226,328 | 7/1993 | Petroff et al. | 73/861.25 |
| 5,333,508 | 8/1994 | Petroff et al. | 73/861.25 |
| 5,363,108 | 11/1994 | Fullerton | 342/27 |
| 5,525,967 | 6/1996 | Azizi et al. | 340/573 |
| 5,552,772 | 9/1996 | Janky et al. | 340/573 |
| 5,677,927 | 10/1997 | Fullerton et al. | 375/200 |
| 5,687,169 | 11/1997 | Fullerton | 770/324 |
| 5,764,696 | 6/1998 | Barnes et al. | 375/239 |
| 5,812,081 | 9/1998 | Fullerton | 342/21 |

*Primary Examiner*—Benjamin C. Lee
*Attorney, Agent, or Firm*—Rhodes, Coats & Bennett, L.L.P.

[57] ABSTRACT

A system is described for discriminating between a transmitted signal and background noise comprising a transmitter adapted to transmit a signal including first and second pulses, separated by a predetermined time interval; and a receiver including a pulse detector to detect pulses received from the transmitter; a delay circuit adapted to delay transmission of the first pulse for a predetermined period of time in communication with the detector to receive a pulse therefrom; and an AND gate having an output, a first input in communication with the delay circuit and an second input in communication with the detector, the time of transmission between the pulses equaling the time delay of the delay circuit, whereby the AND gate allows transmission of a signal only when simultaneously receiving pulses from the detector and the delay circuit. The system can be used in the determination of the distance between two points, or in the location of an object within an area, based upon calculation of the time between transmission of an initial signal and receipt of a return signal.

23 Claims, 5 Drawing Sheets

| Truth Table | | | | | | |
|---|---|---|---|---|---|---|
| 28 | 30 | 32 | 34 | 40 | 42 | 44 |
| 0 | 0 | 0 | 0 | 0 | 0 | 0 |
| 0 | 0 | 0 | 1 | 0 | 0 | 0 |
| 0 | 0 | 1 | 0 | 0 | 0 | 0 |
| 0 | 0 | 1 | 1 | 0 | 1 | 0 |
| 0 | 1 | 0 | 0 | 0 | 0 | 0 |
| 0 | 1 | 0 | 1 | 0 | 0 | 0 |
| 0 | 1 | 1 | 0 | 0 | 0 | 0 |
| 0 | 1 | 1 | 1 | 0 | 1 | 0 |
| 1 | 0 | 0 | 0 | 0 | 0 | 0 |
| 1 | 0 | 0 | 1 | 0 | 0 | 0 |
| 1 | 0 | 1 | 0 | 0 | 0 | 0 |
| 1 | 0 | 1 | 1 | 0 | 1 | 0 |
| 1 | 1 | 0 | 0 | 1 | 0 | 0 |
| 1 | 1 | 0 | 1 | 1 | 0 | 0 |
| 1 | 1 | 1 | 0 | 1 | 0 | 0 |
| 1 | 1 | 1 | 1 | 1 | 1 | 1 |

SIGNAL DISCRIMINATOR AND POSITIONING SYSTEM

BACKGROUND OF THE INVENTION

This application claims priority to provisional application #60/003,102 filed Sep. 1, 1995.

The present invention relates to low level transmission of electronic signals from a transmitter to a remote receiver, and in particular to a method and system for discriminating between a transmitted signal and other signals and background noise. The invention also relates to various applications of this technology to determine object positions and locations.

Aerial transmission of electronic signals, particularly at levels below the noise floor is difficult and in many instances impossible, due to the presence of background electromagnetic radiation and signals from other sources such as radio and television transmitters, telephones and other communication equipment engines and electrical tools. The receiver, instead of only receiving a signal from the transmitter, may mistake a signal from another source, resulting in generation of incorrect data or an untimely response by a device associated with the receiver.

A low-cost system which could discriminate between the desired signal and other electronic interference without the use of a cable or other means for transmitting the signal from the transmitter to the receiver would find many commercial uses. Thus, it is a primary aspect of the invention to provide a system for accurately transmitting and receiving electrical signals without interference from other electronic emissions.

This system can be used for a variety of purposes. For example, the system can be used to determine the position of an individual or object with a high degree of accuracy. These location systems could, in turn, be used to initiate other actions responsive to the locations determined. Thus, it is another aspect of the invention to provide a system for determining the distance to a remote object.

The system can also be used to determine the position of an object within an area by triangulation using three transmitters, which is another aspect of the invention. Location of the source of a radio transmission by triangulation has be used for many years. In this procedure, at least two, and preferably three, radio receivers with directional antennas are tuned to the frequency of the radio transmission, and their antennas are turned to determine the line of best reception. These lines may then be plotted graphically, and their intersection determined, indicating the approximate location of the radio transmitter.

Recently, global positioning system (GPS) receivers have been developed which can locate the position of the GPS receiver by tuning the GPS to a satellite transmission. The determination of a location with a GPS receiver, however, is only accurate to a few feet. Furthermore, commercial GPS receivers cannot "fix" a position fast enough to keep track of a fast moving target, rapidly changing direction in a small area.

While the accuracy of a GPS receiver is adequate for some uses, e.g., location of a boat at sea, or an individual in wilderness terrain it is not accurate enough for other purposes, including the applications described herein. Accordingly, it is an aspect of the present invention to provide a system that can identify the location of a target in a small area with a high degree of accuracy, even when the target is rapidly moving. It is also an aspect of the present invention to provide methods using this system.

Other features of the invention will be apparent to one skilled in the art upon a reading of the detailed description of the invention which follows, taken together wit the drawings. In the description, terms such as horizontal, upright, vertical, above, beneath and the like are used solely for the purpose of clarity in illustrating the invention, and should not be taken as words of limitation.

SUMMARY OF THE INVENTION

Generally, the present invention is comprised of a transmitter adapted to transmit a signal comprised of plurality of pulses separated by predetermined time intervals, and a receiver comprised of a discriminator circuit permitting only the transmission of a signal, i.e., an electrical pulse upon timely receipt of a plurality of pulses corresponding to those of the transmitted signal.

The transmitter is adapted to transmit a signal comprised of plurality of pulses at predetermined time intervals between the last pulse and each preceding pulse in the signal. The signal may be comprised of two or more pulses, depending on the level of discrimination required. A signal comprised of four pulses, including the last pulse, will normally provide sufficient discrimination. It will be apparent to one skilled in the art, however, that the system described herein can be expanded to provide even greater discrimination.

The receiver includes a detector, such as an antenna, a digital discriminator circuit in communication with the antenna and adapted to received signals therefrom, and a signal processor in communication with, and in turn adapted to received signals from, the discriminator circuit. The antenna may be of various constructions know in the art depending on the specifics of the signal being received and the operating environment.

Generally, the discriminator circuit is comprised of an AND gate that communicates with the detector directly and through a delay circuit. As used in description and claims, the term "AND gate" is intended to define an electronic switch having a gating input, a signal input and an output, that prevent the flow of an electronic signal from the signal input to the output, except during the receipt of a gating signal by the gating input. In the present invention, the duration of the gating signal is normally less than about 200 picoseconds in order to achieve the desired discrimination. A circuit meeting this definition is described in detail in U.S. Pat. No. 5,345,471 to McEwan.

It is to be understood that the receiver and the discriminator circuit can, and in most commercial applications will, contain additional components which have been omitted from the present description for clarity. The need for such components and their selection, however, is within the expertise of one skilled in this art. When components, such as the antenna and an AND gate or delay circuit are described or shown as being directly connected, it is to be understood that the direct connection contemplates the presence of intervening components, with the exception of delay circuits.

The discriminator circuit is comprised of a plurality of delay circuits in communication with the antenna, and a plurality of AND gates adapted to allow transmission of a signal to the signal processor only when all delay circuits are at a positive value. The number of delay circuits is equal to the number of pulses forming the signal less one. The time delay of each delay circuit is set to correspond to one of the time delays between pulses in the signal. A pathway is provided from the antenna through each delay circuit to an input of an AND gate. In addition, one pathway is provided directly from the antenna to the input of an AND gate.

In its simplest form, the discriminator circuit will be comprised of a single AND gate and a single delay circuit. The delay circuit may simply be a resistor or capacitor, or more complex circuitry known in the prior art. Essentially, the delay circuit will delay transmission of a pulse for a predetermined length of time. Preferably, the delay circuit is adjustable to allow for different time delays. The input of the delay circuit is connected to the antenna, and the output of the delay circuit is connected to one of the inputs of the AND gate. The other input of the AND gate receives a pulse from the antenna without a time delay.

When using this simple discriminator circuit, the transmitter is adapted to transmit a signal comprised of two pulses, with the time of transmission between the pulses equaling the time delay of the delay circuits. The fist pulse from the transmitter is received by the antenna and transmitted to the delay circuit and to one input of the AND gate. Since only one input to the AND gate is positive, no signal is sent to the signal processor.

When the second pulse is transmitted, however, the pulse travels to one input of the AND gate. At the same time, since the delay in the delay circuit is equal to the time between the pulse, the first pulse is transmitted from the delay circuit to the other input of the AND gate. Since both inputs are positive, i.e., 1, the AND gate transmits a signal to the signal processor.

A more complex system may be required in circumstances where there is a higher likelihood of interference or here significant difficulties would be caused by a false signal. In such instances, the discriminator circuit may be comprised of a greater number of delay circuits, i.e., 3, 5, 7 or more circuits. Each delay circuit will be adjusted to a time delay equal to a corresponding time delay between pulses sent from the transmitter. Additional AND gates will also be provided to received inputs from pairs of delay circuits, and still additional AND gates will be provided to receive inputs from AND gate pairs.

For example, a discriminator circuit can be made using three delay circuits adjusted to different time delays and three AND gates. In this instance, first and second delay circuits each receive pulses from the antenna and transmit a pulse, after a predetermined time delay, to one of the inputs of a first AND gate. The third delay circuit receives pulses from the antenna and transmits a pulse, after a predetermined time delay, to one input of a second AND gate. Pulses are also transmitted directly from the antenna to the other input of the second AND gate. The outputs of the first and second AND gates are in turn connected to the inputs of a third AND gate. The output of the AND gate is then connected to the signal processor.

In the operation with this latter discriminator circuit, a transmitter sends a signal comprised of four pulses with the first, second and third pulses separated from the fourth pulse by first, second and third time delays. These pulses are received by the receiver antenna of the discriminator circuit where the time delays of the three delay circuits are set to correspond to the time delays between the pulses.

The fist pulse is transmitted from the antenna to the three time delay circuits and to one of the inputs of the second AND gate. Since the pulse is only received at the input of the second AND gate that is directly connected to the antenna, i.e., a 0, neither AND gate transmits a signal to the third AND gate. However, this first pulse does begin the time delay sequence for the corresponding first time delay circuit.

Sending of the second and third pulses also fails to produce a signal to the signal processor, since the pulses are not transmitted to the AND gate inputs at the same time, i.e., all of the inputs to the first and second AND gates are not a 1. When the fourth and final pulse of the signal is received, however, all of the first and second AND gate inputs receive a pulse, i.e., a 1, since the fourth pulse is transmitted directly to one of the inputs of the second AND gate, and delayed pulses are transmitted from the delay circuits to the other inputs of the first and second AND gates at the same time. The fist and second AND gate, in turn, transmit positive (1) pulses simultaneously to the third AND gate, which outputs a pulse to the signal processor.

The signal processor receiving a signal from the discriminator circuit can be of various constructions, depending on the use of the system. For example, the signal processor can be as elementary as a switch that is activated by the signal. Alteratively, the signal processor can be a transmitter or other complex device performing a desired function.

One use of the present invention is in determining the distance between a transmitter and a receiver. U.S. Pat. No. 5,361,070 to McEwan, incorporated herein by reference in its entirety, describes an apparatus and method based upon micropower impulse radar (MIR) which is highly accurate in determining distances over a limited range, i.e., up to about 300 meters. A transmitter described by McEwan broadcasts micropower electromagnetic impulses which, at some point in time, strike a target carrying a pulse repeater or transponder. After a short propagation delay, the pulse repeater broadcasts an impulse that returns to the origin of the initial pulse. The time of flight, hence the distance between origin and transponder, can be determined using the "effective time" technique. Modification of this device, as well as other devices comprised of a transmitter and a receiver which sends a responsive signal, i.e., a transponder, is possible with the present invention so that interference from stray electromagnetic signals is avoided.

The present invention may also be used to determine the position of a target, even a moving target, with great accuracy by using a minimum of three micropower impulse radar or other transmitters in conjunction with one transponder.

Specifically, the system used to identify the position of an object comprises:

a) at least three pulse transmitters;

b) a pulse repeater or transponder wit a monitored area to receive a signal from each transmitter and return a signal in response; and c) a computer to calculate the position of the transponder within the monitored area based upon the distances of the transponder from the transmitters.

Preferably, the computer will also be programmed with the coordinates of the transmitters and the periphery of the monitored area. These coordinates can be established by initially moving the transponder around the area and storing the measurements corresponding to the location of the transponder at various positions. For certain purposes, it will also be desirable to store the coordinates of any stationary objects and defined segments within the monitored area. The system may also include a receiver responsive to a signal generated when the transponder is located within, or without, a predetermined section within the monitored area.

The above system is useful for several purposes. For example, the system can be used to monitor the location of a child having an attached transponder and playing within the monitored area, e.g., a residential yard. If the child wanders toward a prohibited zone, such as a pool area, the computer could signal a receiver to produce a loud noise, warning the parent or guardian. The child could wear the pulse repeater/transponder like a wristwatch.

The local positioning system can also be used to monitor the position of pets in a yard, and control their movement. Commercially available "invisible fencing" works in combination wit a shock collar to warn pets away from range boundaries. The "invisible fencing" could be replaced with the local positioning system gaining several major benefits. For example, unlike invisible fencing, the range of the pet could, with a few computer key strokes or mouse clicks, be redefined by the user. Consider the addition of a new flower bed or garden to the monitored area. Instead of having to physically fence off the new restricted area, the user could redefine the range where the pet is allowed to roam. Another major benefit is that the system could be made portable so that the user could take pets to new locations and quickly establish range restrictions in the new location. If the pet wandered too close to the boundary, the computer, via radio, would send out a mild shock warning causing the pet to change direction.

Still another application would use the local positioning system to guide robots, such as lawn mowers through the monitored area.

Various kinds of signals can be transmitted according to the present invention. The signal can be a conventional radio signal, a radar pulse, or an optical signal, such as a laser pulse or a light emitting diode pulse. The detector used will depend upon the type of signal sent.

The ability to use different types of signal transmitter, combined with the elimination of interference from other signal sources or background noise, presents numerous opportunities for use of the technology. For example, the system can be used in wireless data communication, as well as in determining distances in indoor environments, e.g., warehouses, where GPS technology is not suitable.

Therefore, it is an aspect of the invention to provide a system for discriminating between a transmitted signal and background noise comprising a transmitter adapted to transmit a signal including first and second pulses separated by a predetermined time interval, and a receiver to determine when the multi-pulse signal is received. The receiver includes a pulse detector to detect pulses received from the transmitter; a delay circuit adapted to delay transmission of the first pulse for a predetermined period of time in communication with the detector to receive a pulse therefrom; and an AND gate having an output, a first input in communication with the delay circuit and an second input in communication with the detector, the time of transmission between the pulses equaling the time delay of the delay circuit, whereby the AND gate allows transmission of a signal only when simultaneously receiving pulses from the detector and the delay circuit. The system may also include a signal processor, e.g., a second transmitter, in communication with the output of said AND gate. The signal generated by the transmitter can be a radio signal or an optical signal, including a radar signal or a laser signal, and the detector can be an optical detector or an antenna It is another aspect of the invention to provide a more sophisticated system for discriminating between a transmitted signal and background noise comprising a first transmitter adapted to transmit a signal including fist, second, third and final pulses, with the first, second and third pulses being separated from the final pulse by predetermined time intervals; and a receiver that includes a discriminator circuit for determining when the signal is received.

The receiver including a pulse detector to detect pulses from the transmitter, first, second and third delay circuits adapted to delay transmission of the first, second and third pulses for predetermined lengths of time in communication with the detector to receive pulses therefrom; a first AND gate having inputs in communication with the first and second delay circuits and an output; a second AND gate having one input in communication with the third delay circuit, and a second input in communication with the detector, and an output; and a third AND gate having inputs communicating with the outputs of the first and second AND gates, and an output.

The time delay of each delay circuit corresponding to one of the time delays between the final pulse and a preceding pulse. That is, the difference between the first pulse and the final pulse with be equal to the time delay of one of the delay circuits, the difference between the second pulse and the fail pulse will be equal to the time delay of a second delay circuit, and the difference between the third pulse and the final pulse will be equal to the time delay of the third delay circuit.

It is a further aspect of the invention to provide a system for determining the distance between first and second positions comprising a first transmitter at the first position adapted to transmit a first signal to the second position; a first receiver at the second position to receive the signal from the first transmitter; a second transmitter at the second position in communication with the first receiver adapted to send a rum signal to the first transmitter after a predetermined time following receipt of a signal by the first receiver; a second receiver at the first position to receive the return signal; and a data processor in communication with the first transmitter and the second receiver to calculate the distance between the first and second positions based upon the time difference between sending of the first signal from said first transmitter and receipt of a return signal from the second receiver at the first transmitter, the predetermined time delay, and the speed of light.

Discrimination of the first signal from background noise can be accomplished by utilizing a first signal that includes first and second pulses separated by a predetermined time interval, and a receiver that returns a signal only upon receipt of the multi-pulse signal. Similarly, the return signal can be distinguished from background noise by using a multi-pulse signal, and a receiver that only records receipt of the multi-pulse. The construction of the receiver can be as described for the signal discriminator system discussed above.

It is yet another aspect of the invention to provide a system for determining the position of an object within an area comprising at least three stationary transponders positioned to send signals across an area and to a object to which a moveable transponder is attached. The system also comprises a computer or data processor that is in communication with the stationary transponders to calculate the position of the moveable transponder, and thus the object, within the monitored area based upon the elapsed time between the sending of signals by the stationary transponders and receipt by the stationary transponders of return signals from the moveable transponder, and the known locations of said stationary transponders. The data processor also takes into account a predetermined time delay between receipt of a signal by the moveable transponder and initiation of the return signal. The data processor is further adapted to calculate the position of the moveable transponder within the area, by including known coordinates of the area in its calculation.

The system can further include a receiver in communication with the data processor, whereby the data processor is adapted to send a signal to the receiver when the moveable transponder is determined to be within a predetermined location. The receiver, in, can actuate another mechanism, such as an alarm, a current generator, or a steering mechanism.

Additionally, it is an aspect of the invention to provide a method for determining the distance between first and second positions comprising transmitting a first signal from the first position to the second position; receiving the first signal at the second position; transmitting a return signal from the second position to the first position after receipt of the first sign and a predetermined delay; receiving the return signal at the first position; and calculating the distance between the first and second positions based upon the difference between the time the first sign is sent and the time the return signal is received, and the predetermined time delay.

It is also an aspect of the invention to provide a method for determining the position of an object within an area, e.g., a residential lawn, comprising sending initial signals from at least three stationary locations across the area and to the object; receiving the initial signals from the three stationary locations at the object; sending three return signals from the object to the stationary locations in response to the initial signals; receiving the return signals at the stationary locations; and calculating the position of the object based upon the elapsed time between sending of initial signals and receipt of return signals, taking into account any predetermined time delay between receipt of an initial signal and sending of a return signal. The initial signals and/or the return signals may be and the receivers may include discriminator circuitry of the type described previously in order to distinguish the signal from background noise or other signals.

These and other aspects of the invention will be obvious to one skilled in the art upon a reading of the detailed description of the preferred embodiment which follows, taken together with the drawings.

DETAILED DESCRIPTION OF THE DRAWINGS

BRIEF DESCRIPTION OF THE PREFERRED EMBODIMENTS

Figure 1:
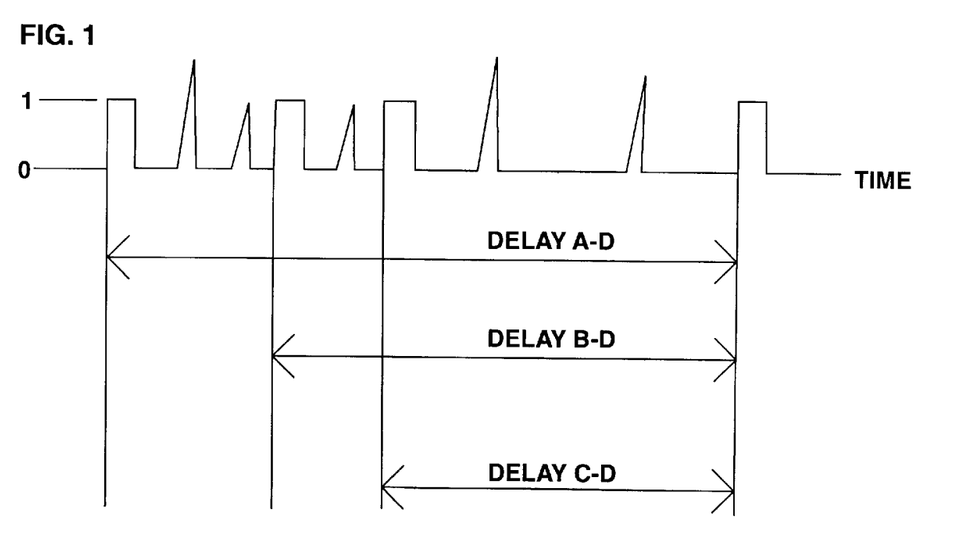
FIG. 1 is a diagrammatic representation of a multi-pulse signal along with background noise.

FIG. 1 illustrates a transmitted signal comprised of pulses A, B, C and D with background noise, shown by triangular peaks, present. Pulses A and D are separated by a time delay A–D, pulses B and D by a time delay B–D, and pulses C and D by a time delay C–D. Time delay A–D will normally be on the order of a few picoseconds, while time delays B–D and C–D will by percentage of time delay A–D.

Figure 2:
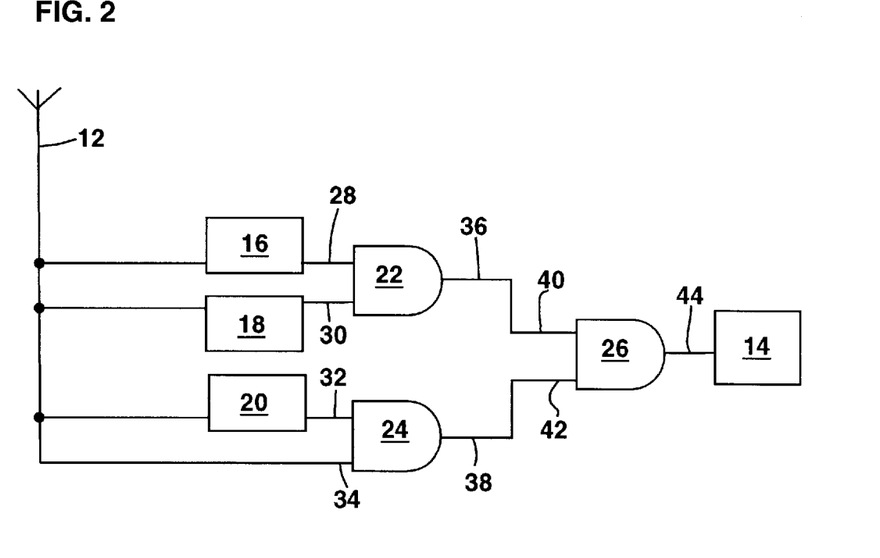
FIG. 2 is a diagram of the digital discriminator circuit of the present invention.
Figure 3:
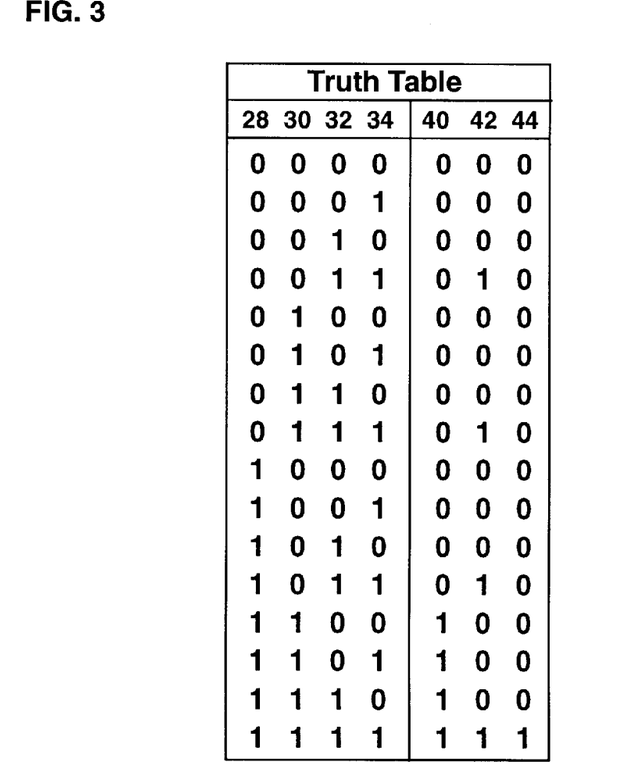
FIG. 3 is a truth table for the discriminator circuit shown in FIG. 2.

FIG. 2 illustrates a digital discriminator circuit, generally 10, connected to an antenna 12 to receive input pulses, and to a signal processor 14 to which the discriminator circuit transmits a signal. Circuit 10 is comprised of delay circuits 16, 18 and 20, and AND gates 22, 24 and 26. Other components and sub-assemblies may also be present. Delay circuits 16 and 18 are connected to antenna 12 and to inputs 28 and 30, respectively, of AND gate 22. Delay circuit 20 is connected between antenna 12 and input 32 of AND gate 24. Antenna 12 is also connected to input 34 of AND gate 24. Outputs 36 and 38 of AND gates 22 and 24, respectively, are connected to inputs 40 and 42 of AND gate 26. Output 44 of AND gate 26 is connected to signal processor 14.

In the preferred embodiment of the invention, signal processor 14 may be a transponder designed to return a signal to the transmitter upon receipt of a signal. The transmitter part of the transponder may be of the previously described construction so that a multi-pulse signal is sent, in which case the receiver for the signal from the transponder may include the discriminator circuitry. With this system, three transmitters and a transponder can be used to precisely determine the location of an object, even if the object is moving.

Figure 4:
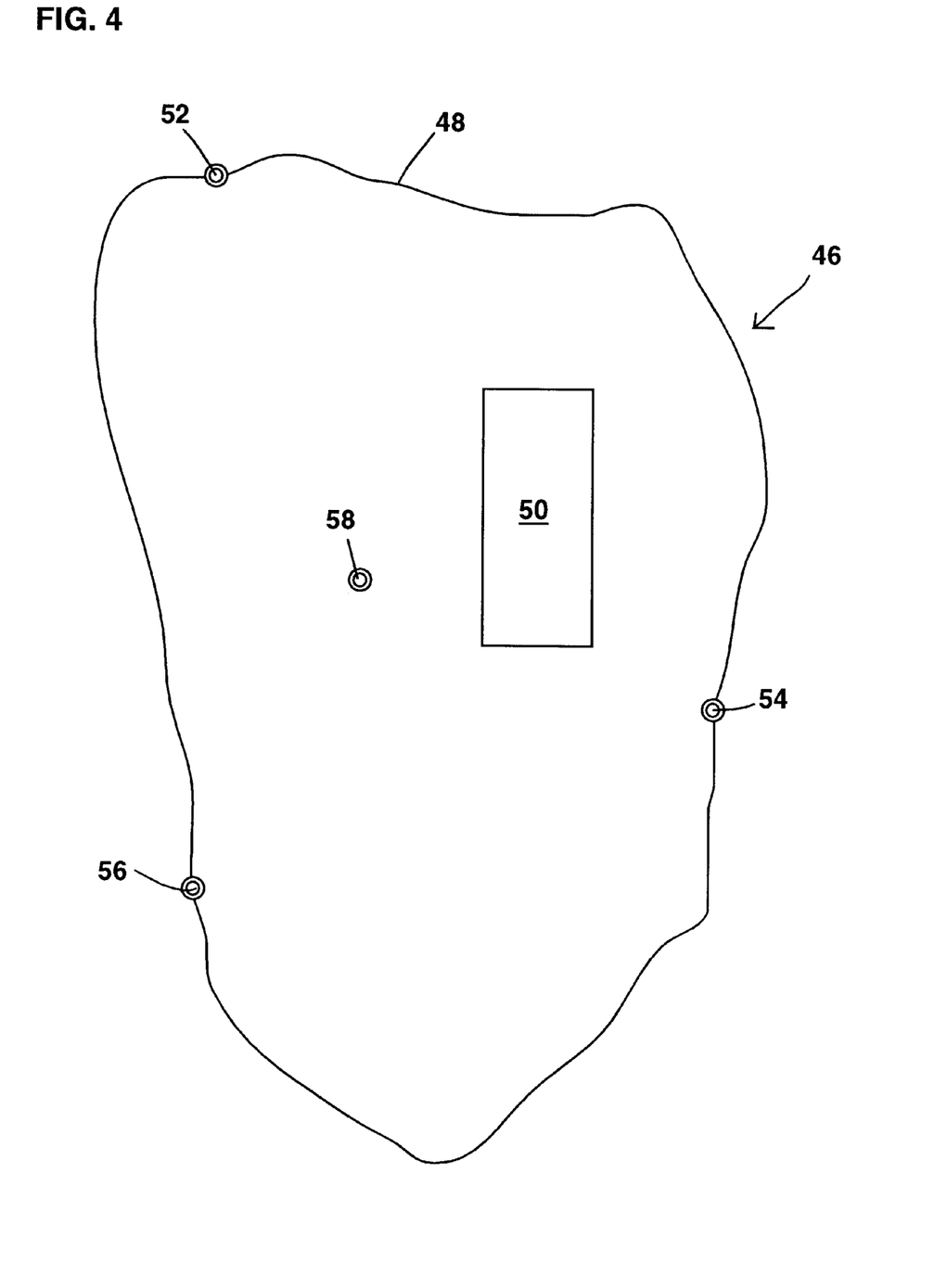
FIG. 4 depicts an overhead view of a residential yard with three radar transmitters positioned to monitor the movement of a target carrying a transponder.

As an example, FIG. 4 illustrates a monitored area, e.g., a residential yard, generally 46, within an outer periphery 48, and an internal segment 50. Three pulse transmitters 52, 54 and 56 are positioned so that the signal transmitted by each transmitter will emend over area 46. A target, e.g., a child, carrying a transponder 58, is freely movable within area 46.

Figure 5:
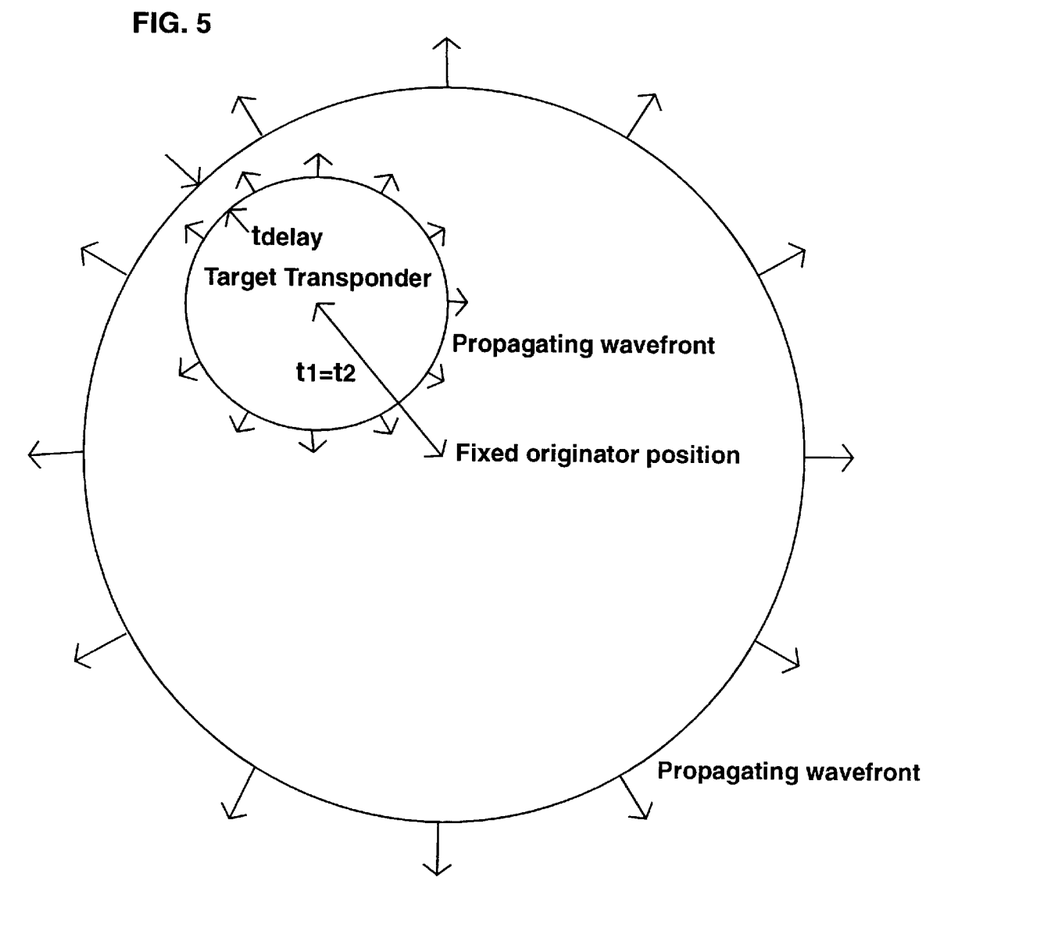
FIG. 5 depicts an electromagnetic pulse wave front that has just passed through the receiver antenna of a pulse repeater/transponder.
Figure 6:
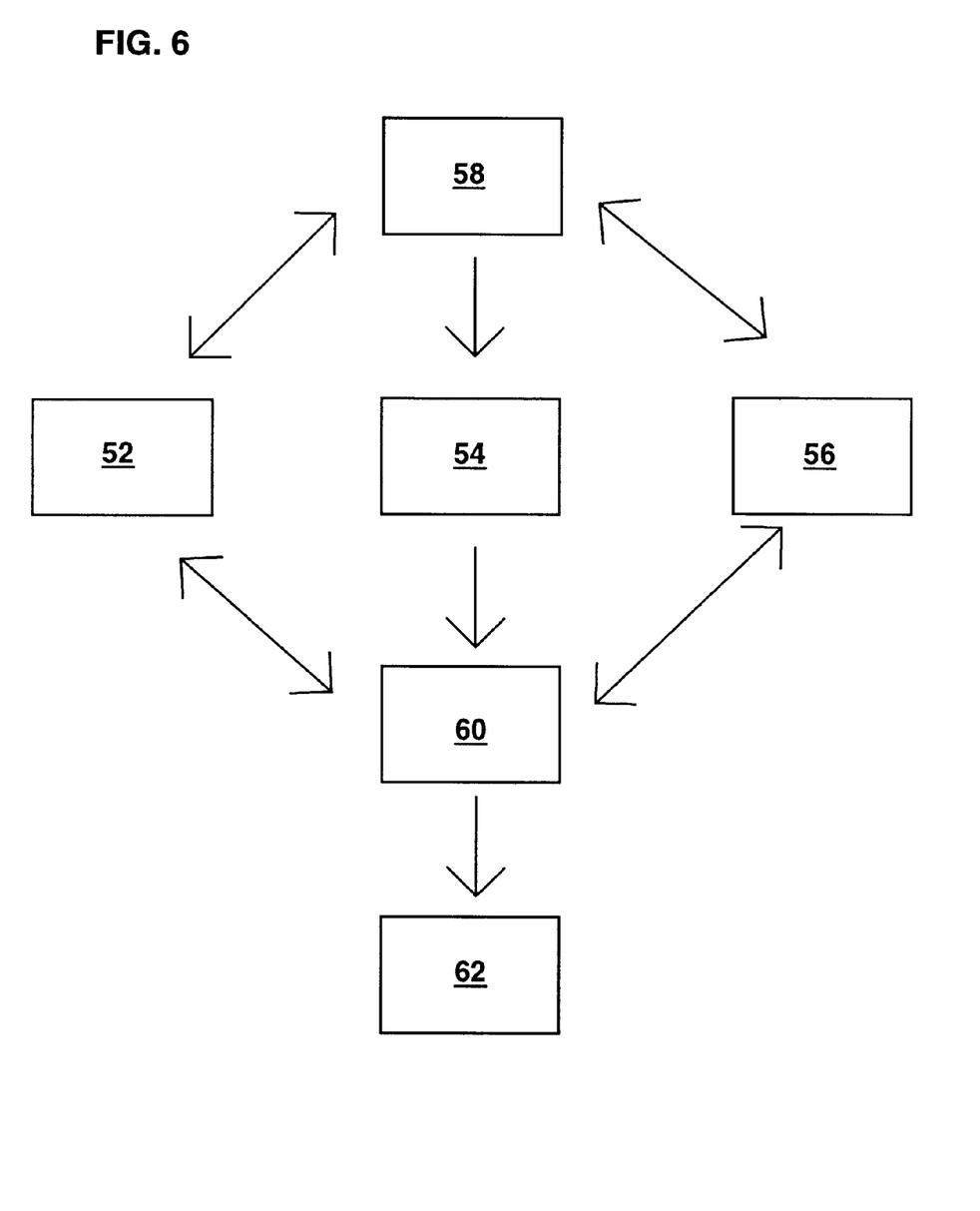
FIG. 6 is a diagram showing the association of the transmitters with a computer and a signal processor.

As illustrated in FIG. 5, transmitter 52 emits a multi-pulse signal which, upon being received by transponder 58, triggers a return signal, which may be comprised of multiple pulses, after a short, but inherent, known time delay. A portion of this triggered signal will travel back to transmitter 52. Since the speed of light is a constant, and the time delay in Responder 58 is known, the distance between transmitter 52 and target transponder 58 can then be calculated by measuring the time between the initial emission and receipt of the return emission, taking into account the known time delay. By also determining the distances between transponder 58 and the other two transmitters 54 and 56, the range and bearing of the target carrying transponder 58 with reference to all of the transmitters can be ascertained.

As shown in FIG. 5, information from transmitters 52, 54 and 56 relating to the time of pulse transmission and receipt is directed to a computer 60 for processing. Computer 60 may, in turn, transmit a signal to a signal processor 62 to initiate further action. A map of area 46 is preferably initially stored in computer 60 by positioning transponder 58 at various points along periphery 48 and around segment 50. Impulses are then sent from each of transmitters 52, 54 and 56, and the position of each measured location is stored in the database of computer 60, together producing a map of area 46.

Transponder 58 is attached to the target to be monitored within area 46. Signals are sent by transmitters 52, 54 and 56 several times per second, resulting in return signals from transponder 58. The times of the signals and return signals are fed to computer 60, where the information is processed to determine the position of transponder 58, and thus the target, within area 46. When the target is at a predetermined location, e.g., the edge of segment 48, computer 60 generates a signal which is transmitted to signal processor 62.

If the target being monitored is a child, signal processor 62 may be a horn to signal the parent or guardian. If the target being monitored is a pet dog, signal processor 62 may be a collar on the dog that causes an electrical shock to the animal upon receipt of the signal. If the target is a lawn mower, signal processor 62 may be the steering mechanism of the lawn mower.

While the preferred embodiment of the invention has been described in terms of an arrangement of three transmitters and one transponder located on the target, it will be apparent to one skilled in the art that similar results can be achieved with the use of a single transmitter carried by the target and thee stationary transponders. With this alternative, a single impulse is emitted by the transmitter, and return pulses are emitted by the three stationary transponders. The times of the initial pulse, and the times of receipt of the return pulses are then recorded by the computer and used to calculate the position of the single transmitter relative to the three transponders.

Certain modifications and improvements will occur to those skilled in the art upon a reading of the foregoing description. It should be understood that all such modifications and improvements have been deleted herein for the sake of conciseness and readability but are properly within the scope of the invention.

What is claimed is:

1. An ultra wideband receiver capable of discriminating between first and second unmodulated, electromagnetic pulses, said pulses being separated by a predetermined time interval, and background noise comprising:
    a) a detector to receive first and second unmodulated, electromagnetic pulses from a transmitter;
    b) a delay circuit adapted to delay transmission of said first pulse for a predetermined period of time in communication with said detector; and
    c) an AND circuit having a gating input in communication with said delay circuit, and a signal input in communication with said detector, the time of transmission between said pulses equaling the time delay of the delay circuit.

2. The receiver of claim 1, wherein the duration of said first pulse is less than 200 picoseconds.

3. The receiver of claim 1, wherein said pulse is a radio frequency signal and said detector is an antenna.

4. The system of claim 1, wherein said signal is an impulse signal and said detector is an antenna.

5. A system for discriminating between a transmitted signal and background noise comprising:
    a) a first transmitter adapted to transmit at least first and second unmodulated, electromagnetic pulses being separated by a predetermined time interval; and
    b) a receiver including a detector to receive said unmodulated, electromagnetic pulses from said transmitter; a delay circuit adapted to delay transmission of a pulse for a predetermined period of time in communication with said detector; and an AND logic having a gating input in communication with said delay circuit, and a signal input in communication with said detector, the time of transmission between said unmodulated, electromagnetic pulses equaling the time delay of said delay circuit.

6. The system of claim 5, wherein said first transmitter transmits micropower electromagnetic pulses.

7. The system of claim 5, wherein said first transmitter transmits impulses.

8. The system of claim 5, wherein said transmitter is adapted to transmit first, second, third and final pulses, said first, second and third pulses being separated from said final pulse by predetermined times, and said receiver includes a pulse detector to detect pulses from said transmitter, first, second and third delay circuits adapted to delay transmission of said first, second and third pulses for predetermined lengths of time in communication with said detector to receive pulses therefrom; a first AND logic having inputs in communication with said first and second delay circuits and an output; a second AND logic having one input in communication with said third delay circuit, and a second input in communication with said detector, and an output; and a third AND logic having inputs communicating with the outputs of said first and second AND logic, and an output; the time delay of each delay circuit corresponding to one of the time delays between the final pulse and a preceding pulse.

9. The system of claim 8, further including a signal processor in communication with the output of said third AND logic.

10. The system of claim 9, wherein said signal processor includes a second transmitter adapted to send a return signal upon receiving an output from said third AND logic.

11. The system of claim 10, further including processor means to calculate the distance between said first transmitter and said receiver based upon the time between transmission by the first transmitter and the time of receipt of a return signal at said first transmitter.

12. A system for determining the distance between first and second positions comprising:
    a) a first transmitter at said first position adapted to transmit unmodulated, electromagnetic pulses separated by a predetermined time intervals to said second position;
    b) a first receiver at said second position to receive said pulses from said first transmitter, said first receiver including a pulse detector to detect pulses from said transmitter; a delay circuit adapted to delay transmission of a pulse for a predetermined period of time in communication with said detector to receive a pulse therefrom; and an AND logic having an output, a gating input in communication with said delay circuit and an signal input in communication with said detector, the time of transmission between the pulses reaching said AND logic equaling the time delay of the delay circuit;
    c) a second transmitter at said second position in communication with said first receiver adapted to send a return signal upon receipt of a signal by said first receiver;
    d) a second receiver at said first position to receive said return signal; and
    e) a data processor in communication with said first transmitter and said second receiver to calculate the distance between said first and second positions based upon the difference between the time a transmission is sent from said first transmitter and the time the return signal is received by said second receiver.

13. A system for determining the position of an object within an area comprising:
    a) at least three stationary transceivers positioned to send signals across said area and to said object;
    b) a moveable transponder attached to said object; and
    c) a data processor in communication with said stationary transceivers to calculate the position of said moveable transponder within the monitored area based upon the elapsed time between the sending of signals by the stationary transceivers and receipt by the stationary transceivers of return signals from the moveable transponder, and the known locations of said stationary transceivers, said transceivers capable of sending unmodulated, electromagnetic pulses to form the signal and said transponder having an ultra wideband receiver capable of discriminating between first and second unmodulated, electromagnetic pulses, said pulses being separated by a predetermined time interval, and background noise comprising:

a) a detector to receive first and second unmodulated, electromagnetic pulses from a transmitter;

b) a delay circuit adapted to delay transmission of said first pulse for a predetermined period of time in communication with said detector; and c) an AND circuit having a gating input in communication with said delay circuit, and a signal input in communication with said detector, the time of transmission between said pulses equaling the time delay of the delay circuit.

14. The system of claim 13, wherein the data processor is further adapted to calculate the position of the moveable transponder within the area, based upon the known coordinates of the area.

15. The system of claim 13, wherein said area is a residential yard.

16. The system of claim 13, wherein said signals are impulses.

17. The system of claim 13, wherein said receiver is in communication with said computer, whereby a computer is adapted to send signal to said receiver when said moveable transponder is determined to be within a predetermined location.

18. The system of claim 17, wherein said receiver includes an alarm activated by receipt of a signal from said computer.

19. The system of 17, wherein said receiver produces an electrical current upon receipt of a signal from said computer.

20. The system of claim 17, wherein said receiver is part of a vehicle control mechanism.

21. A method for determining the distance between first and second positions comprising:

a) transmitting first and second signals formed of unmodulated, electromagnetic pulses from said first position to said second position;

b) receiving said first signal at said second position by detecting and delaying said first pulse for a set period and detecting said second pulse after the set period;

c) transmitting a return signal from said second position to said first position after receipt of said first signal;

d) receiving said return signal at said first position; and e) calculating the distance between said first and second positions based upon the difference between the time the first signal is sent and the time the return signal is received.

22. A method for determining the position of an object within an area comprising:

a) sending initial signals formed of at least first and second unmodulated, electromagnetic pulses from at least three stationary locations across said area and to said object;

b) receiving said initial signals at said object by detecting and delaying said first pulse for a set period and detecting said second pulse after the set period;

c) sending return signals from said object to said stationary locations upon receipt of said initial signals;

c) receiving said return signals at said stationary locations; and d) calculating the position of the object based upon the elapsed time between sending of initial signals and receipt of return signals.

23. The method of claim 22, wherein said initial signals are impulses.

* * * * *